United States Patent Office 3,505,367
Patented Apr. 7, 1970

3,505,367
PROCESS FOR PURIFYING RAW SULFONATES
Henri Brunel, 9 Rue du General Niox,
Paris, France
No Drawing. Continuation-in-part of application Ser. No. 97,711, Feb. 28, 1961. This application Sept. 16, 1964, Ser. No. 397,012
Int. Cl. C07c 143/90
U.S. Cl. 260—400                               4 Claims

ABSTRACT OF THE DISCLOSURE

The invention relates to a process of purifying raw aqueous, alcohol, sulfonate mixtures by treating the mixtures with alakali metal nitrites or alkali metal chromates to produce a two phase system in which the major part of the alcohol is retained in the aqueous phase; the phases are separated and the further purification of the organic phase is simplified while, at the same time, a major portion of the salt remaining in the organic phase is the alkali metal nitrite or alkali metal chromate.

---

This invention relates to a process for purifying raw sulfonates.

This application is a continuation-in-part of U.S. application Ser. No. 97,711 filed Feb. 28, 1961 now abandoned.

Among the objects of this invention is to provide an economical process for obtaining purified sulfonates which are substantially free of corrosive or rust-promoting salts.

Among other objects of the invention is to provide a process of obtaining sulfonate compositions having antitrust properties from raw mixtures formed in the sulfonating and neutralizing of sulfonatable materials such as hydrocarbon oils, vegetable and animal oils, fatty acids, fatty alcohols and fatty amidoalcohols.

A very particular object of the invention is to provide a process of obtaining purified sulfonates from the raw alcoholic mixtures obtained by sulfonation of petroleum oils in the preparation of refined petroleum oils and extraction of the sulfonates from said oils after subsequent neutralization.

Another very particular object of the invention is to separate from the sulfonates, before distilling them, the greatest part of the alcohol contained in such raw alcoholic mixtures.

The process of the invention is useful for obtaining purified sulfonates from the raw mixture of sulfonates obtained by the conventional process of refining hydrocarbon oils. The process of this application is also useful for obtaining purified sulfonates from the raw sulfonated mixture obtained according to my U.S. patent application Ser. No. 36,370 filed June 9, 1960, now Patent No. 3,164,547. In that application there is described a direct method of obtaining a raw sulfonate mixture by conducting the refining process so that three fractions separate, an upper oil fraction, a middle sulfonate fraction and a lower hydroalcoholic solution of metal salts.

The raw sulfonate mixtures from which the purified sulfonates are obtained according to the present invention contain the following components: (1) alkali metal sulfonates formed by neutralization with alkali metal basic compounds of sulfonic acids retained with the oil, (2) alcohol added for extracting sulfonates from the neutralized sulfonated mixture, (3) water which may have been added with the alcohol, or with the neutralizing agent, or resulting from neutralization, (4) an excess of alkali metal hydroxide or similar basic compound, (5) alkali sulfates and sulfites formed by neutralization of $H_2SO_4$ and $SO_2$, and (6) oil or corresponding fatty raw material retained by or with the sulfonates. These raw sulfonate mixtures may be defined as "raw aqueous alcohol sulfonate mixtures." The alcohols which are present are water soluble alcohols, that is to say alcohols showing less than 4 carbon atoms such as methyl, ethyl, propyl, isopropyl, or mixtures thereof. The term "water soluble alcohols" will be understood to refer to these alcohols.

In its briefest form, the process of the invention comprises the steps of (1) mixing the raw aqueous alcohol sulfonate mixture with an alkali-metal nitrite (either as crystallized salt or as a relatively concentrated solution thereof) or a neutral alkali metal chromate to provide a two phase system, a lighter phase, referred to as the organic phase, which includes the sulfonates, and a heavier aqueous phase which includes neutral salts and alcohol, (2) separating the organic phase while maintaining the temperature between a minimum and a maximum and, finally distilling and drying the lighter organic phase, this latter step being carried out carefully until no froth forms. The minimum temperature is the temperature necessary for obtaining a good separation of the two phases. It is generally between 40° and 50° C. The maximum temperature is the boiling point of the alcohol included in the original raw mixture that is to say between 60° and 90° C.

It is emphasized that, according to the invention, an important part of the alcohol being separated with the aqueous phase, the distilling and drying of the purified sulfonates are much easier and more rapid than in the conventional process.

Unless otherwise stated, all proportions of percentages recited in this specification are by weight.

Thus, where high purity of the sulfonates is not required, these basic steps are sufficient to produce valuable products. Sulfonates obtained by these basic steps are suitable for many uses, since the proportion of salt present is still less than 2.5% and almost all of the salt remaining is the alkali nitrite.

One advantage of the process is that the small amount of alkali nitrite that is retained by the sulfonate has anticorrosive properties and acts to increase the antirust properties of the product. Besides, in the treatment, the sulfates and sulfites are preferentially eliminated to a greater extent than the alkali nitrite on account of the decrease of the solubility of said sulfates and sulfites in the organic phase in presence of alkali metal nitrite.

Practically, according to the invention, there may remain in the purified sulfonates, at most the proportion of sulfates and sulfites able to dissolve in a concentrated solution of alkali metal nitrite, and this proportion under the conditions of the process is always under 20% of the total salts retained in the purified sulfonates.

The salt added in step (1) is preferably added in the proportion of 2–15% by weight of the raw mixture, although higher amounts may be employed without producing any particularly beneficial or detrimental effect other than the incomplete dissolution of the salt in the raw mixture to be purified. If desired, the crystallized alkali nitrite can be replaced by an aqueous solution of the same in concentrations of 5% up to saturation, the amount of said salt added being substantially the same 2–15%.

The separation of step (2) can be carried out by settling and decanting or by centrifuging.

In the final distillation step, the temperature may reach 120–130° C. when conducted at atmospheric pressure, but is less when distillation is conducted under reduced pressure. Usually, the distillation at step (2) is conducted so as to reach 95°–105° C. at the end of the operation.

To prepare a product of greater purity, a third and fourth step are added after step (2) and before the final distillation step as follows: (3) an aqueous solution of alkali nitrite is added to the organic phase separated at step (2) so as to produce a two phase system and (4) again the organic phase is separated from the aqueous phase while maintaining the temperature at 50–85° C. The final distillation step (which becomes step (5) in this modification) is then conducted as in the shorter process, but the temperature may reach 120°–130° C. at the end of the distillation.

For step (3), the aqueous solution has a concentration of 5–15% and is added in the proportion of 20–50% of the organic phase.

The sulfonates obtained with the addition of steps (3) and (4) contain only very small amounts of inorganic salts and especially of corrosive or rust-promoting metal salts (sulfites and sulfates). The proportion of such salts is always less than 0.5% and is usually between 0.1 and 0.2%, a concentration at which the said salts are non-corrosive especially in the presence of the alkali metal nitrite which accompanies them since even when the separation of the two phases is carefully effected, a small amount of alkali nitrite still remains in the sulfonates. Complete elimination of all metal salts when necessary is obtained by diluting the sulfonates obtained after distillation in step (5) with a light hydrocarbon, for fluidizing them, and centrifuging or filtering. However, as already indicated, the presence of the alkali nitrite can be advantageous and this is especially so when the sulfonate is to be employed for the manufacture of emulsifiers, emulsifiable oils, antirust oils, etc.

It will be noted that in the process of this invention, the greatest part of the alcohol initially contained in the raw aqueous alcohol sulfonate mixtures separates with the aqueous phase and such alcohol can be recovered from the aqueous phase separated at step (2) of the process. Small amounts of alcohol can be recovered from the aqueous phase separated at step (4) and in the final distillation and drying of the purified sulfonates.

It is emphasized that the process is useful for the purification of any sulfonated organic compound or mixture which contains metal salts resulting from the treatment of sulfonatable compounds or mixtures with sulfuric acid, oleum, $SO_3$, chlorosulfuric or fluosulfuric acid and neutralizing of the sulfuric acid or $SO_2$ or $SO_3$ or HCl or HF retained by the compound or mixture. Thus, the process has been successful in the purification of sulfonated olefins and of any sulfonate of synthetic hydrocarbon oils such as alkyl aryl sulfonates of low, medium or high molecular weight, tetra propylene benezene sulfonates, alkyl napthalene sulfonates, etc. and even sulfonated compounds obtained by sulfonation of vegetable and animal oils, or of certain derivatives thereof, such as fatty alcohols and amidoalcohols. The examples which follow, therefore, are presented in order to illustrate in detail how the process is carried out, with a variety of different sulfonated products, but it will be realized that the process is widely adapted without substantial change to the purification of sulfonated products which contain metal salt impurities resulting from the previous sulfonation and neutralization steps and which as already stated may be broadly defined as "raw aqueous alcohol sulfonate mixtures."

EXAMPLE 1

The raw sulfonate mixture treated is obtained from the sulfonation of petroleum oil in the known way by treating the petroleum oil with sulfuric acid or oleum to sulfonate all or a portion of the sulfonatable compounds thereof, adding a hydroalcoholic solution of sodium hydroxide to the mix and separating (after settling, for example) the oil on the one hand and, a raw mixture having the appearance of a whitish emulsion on the other hand.

To 1000 kilograms of said raw mixture, 50 kilograms of commercial or technical grade crystalized sodium nitrite are added while agitating and heating to 80–85° C. A two phase system is produced and thereafter the temperature is maintained between 50 and 85° C., while the phases are separated by settling and decanting, or by centrifuging, for example. The heavier phase is made up of an aqueous solution of metal salts containing alcohol. The lighter or organic phase in this example amounts to about 650 kilograms. To this 650 kg. phase, 200 kg. of spindle oil of a viscosity of 1.8 to 3° Engler at 50° C. (as a thinning oil) and 200 kg. of a 10% aqueous solution of sodium nitrite are added, while agitating and maintaining the temperature at about 70 to 85° C. An even more fluid oil (lower viscosity) or even kerosene may be substituted for the spindle oil. A two phase system is again produced and the phases are separated by settling while maintaining the temperature at between 50–85° C. and decanting. The heavier, (lower) phase is aqueous and the lighter phase is the organic material. The separated organic layer is then progressively heated up to 120–125° C. whereupon 500–600 kg. of a syrup-like products which remains limpid when warm and when cold and when mixed with oil is obtained. By analysis such products usually contain 35–40% of oil soluble sulfonates, less than 1% of metal salts of which at least 80% is sodium nitrite, less than 1% of water, and remainder being oil, some of which is retained from the original petroleum oil and some from the oil added. This purified sulfonate composition not only does not promote rusting but is possessed with antirust properties and is useful in any process or composition requiring an oil solution of sulfonates.

The aqueous phases which are separated are distilled to recover the alcohol which may be reused.

EXAMPLE 2

A raw mixture similar to that employed in Example 1 but obtained instead from the purification of spindle oils or diesel oils is treated as follows: to 1000 kg. of such raw mixture, 50 kg. of crystallized sodium nitrite is added while agitating and heating up to about 85° C. The mix is allowed to settle while the temperature is maintained between 50° and 85° C., whereupon a lower or heavier aqueous layer and an upper or lighter organic layer are formed. After decanting, the separated, upper organic layer is heated progressively up to 95–105° C. or until froth ceases to form. There are thus obtained 400–500 kg. of a purified product possessed with antirust properties containing 45–60% of oil soluble sulfonates, 3 to 8% of water, 20 to 45% of oil and 1 to 3% of metal salts of which 80–90% is sodium nitrite.

The aqueous fraction obtained may be distilled to recover the alcohol for reuse.

EXAMPLE 3

A shale oil of a viscosity of 3 to 4° Engler at 50° C. which has been partly hydrogenated, is refined by treating with sulfuric acid or oleum, decanted to remove sludge, neutralized with a sodium hydroxide solution in water and ethyl or isopropyl alcohol, and the oil phase thereof separated from the sulfonate-alcohol-water phase. This latter phase constitutes the raw mixture of the present example. This raw mixture is treated as in Example 1 or Example 2 to obtain purified clear sulfonates having low contents of corrosive metal salts corresponding to those of Examples 1 and 2 respectively and possessed with antirust properties.

EXAMPLE 4

To 100 kg. product obtained in Example 1, or Example 2, 200 kg. of a very light hydrocarbon oil such as petroleum ether is added to provide a fluid mixture. This mixture is centrifuged to remove a small amount of sediment. The resultant liquid is distilled to remove and recover the light hydrocarbon and provide a residual product which is substantially completely free of metal salts.

EXAMPLE 5

An aqueous alcoholic solution of alkyl-aryl monosulfonates containing significant amounts of metal salts, which have been obtained by sulfonating alkyl-aryl hydrocarbons such as dodecyl benzene with 100% sulfuric acid in sufficient amount to substantially sulfonate all the hydrocarbons, washing with water and then neutralizing with an aqueous alcohol solution of sodium hydroxide, is treated as in Examples 1 or 2. Purified alkyl-aryl sulfonate compositions having correspondingly low metal salt contents and possessed with antirust properties are obtained.

EXAMPLE 6

An aqueous alcoholic solution of alkyl-aryl sulfonates containing significant amounts of metal salts which have been obtained by sulfonating a higher cut of alkyl-aryl hydrocarbons having a viscosity of 4 to 6° Engler at 50° C. with oleum, in sufficient amount to substantially sulfonate all the sulfonatable hydrocarbons, washing with water and then neutralizing with an aqueous alcohol solution of sodium hydroxide is treated as in Examples 1 or 2. Purified alkylaryl sulfonate compositions having correspondingly low metal salt contents and possessed with antirust properties are obtained.

EXAMPLE 7

To an aqueous solution of secondary alcohols sulfates as are obtained in the manufacturing of detergents in the petroleum chemical industry by suufonating olefins, washing and then neutralizing, there is added ethyl or isopropyl alcohol in proportion of 10 to 20%. The hydro-alcoholic solution thus obtained constitutes the raw mixture which is treated as in Examples 1 or 2. The products obtained are purified sulfates of secondary alcohols having a very low content of metal salts and possessed with anti-rust properties.

EXAMPLE 8

To an aqueous solution of high-molecular-weight, secondary alcohol sulfates obtained by sulfonating a higher olefin cut, washing and neutralizing, there is added, ethyl or isopropyl alcohol in proportion of 10 to 20%. The hydroalcoholic solution thus obtained constitutes the raw mixture which is treated as in Examples 1 or 2. The products obtained are purified sulfates of higher secondary alcohols having a very low content of metal salts and possessed with antirust properties.

The same results are obtained with any other sulfonatable synthetic hydrocarbon oil. The neutralization may be effected with an aqueous solution of an alkali metal hydroxide without alcohol. Then alcohol is added to the neutralized sulfonate mixture and the aqueous alcohol solution thus obtained constitutes the raw mixture which is treated as in Examples 1 or 2.

EXAMPLE 9

The sulfonate fraction obtained by the sulfonation and neutralization of impure lauryl alcohol such as obtained by hydrogenation of a lauric-acid-containing mixture is treated as in Examples 7 or 8, except that when the procedure of Example 1 is followed, the thinning oil employed is a white oil. The products obtained are purified sulfates of fatty alcohols having a very low content of metal salts and possessed with antirust properties.

EXAMPLE 10

The raw aqueous alcoholic solution of alkali metal salt of sulforicinoleic acid obtained as the heavier phase in the sulfonation and neutralization of ricinoleic acid is treated as in Examples 1 or 9. In each case, a purified alkali metal salt of ricinoleic acid having low salt contents corresponding to the salt content of Examples 1 and 2, and possessed with antirust properties is obtained.

EXAMPLE 11

The raw aqueous alcoholic solution of alkali metal salts and sulfonated oil obtained from the treatment of fish oil with sulfuric acid or oleum, subsequent neutralization, and addition of alcohol is treated as in Example 1, except that after the second decantation the organic phase is distilled under a vacuum of 30 to 10 mm. of Hg. The resultant product is a neutral and odorless sulfonated fish oil product with a very low content of metal salts and possessed with antirust properties.

EXAMPLE 12

A raw sulfonated fatty amide alcohol such as the sulfate of monoethanolamide of lauric or palmitic acid is treated in place of lauryl alcohol of Example 7 to provide a pure sulfate of the amido alcohol possessed with antirust properties.

EXAMPLE 13

The process is conducted as in Example 1, but 50 kg. of crystallized sodium chromate are substituted for the 50 kg. of crystallized sodium nitrite the first step of said process. The remaining steps may be conducted as in Example 1 or, if desired, 200 kg. of a 10% aqueous solution of sodium chromate may be substituted for the 10% aqueous solution of sodium nitrite in the subsequent phase separation step. The product obtained by the substitution of the alkali metal chromate for the alkali metal nitrite has approximately the same purity as set forth in Example 1, but has a darker color. Products containing chromates are sometimes objectionable because of the toxicity of the chromates, but such is not always the case.

I claim:

1. In a process for removing water, water soluble alcohols, corrosive metal sulfates and sulfites from raw aqueous alcohol sulfonate mixtures resulting from the sulfonation and subsequent neutralization of sulfonatable materials selected from the group consisting of sulfonatable hydrocarbon oils, sulfonatable vegetable and animal oils, sulfonated fatty acids, sulfonatable fatty alcohols and sulfonated fatty amido alcohols, the improvement comprising adding 2–15% sodium nitrite to said raw aqueous alcohol sulfonate mixture while maintaining the temperature at between 40° and 90° C. to produce a two-phase system comprising an organic phase including the sulfonates and an aqueous phase including said corrosive metal salts and alcohol, separating the organic phase from the aqueous phase while maintaining the temperature at 40–90° C. whereby at least 80% of the salt remaining in said organic phase is sodium nitrite, and thereafter distilling the organic phase at 95–130° C.

2. The process as claimed in claim 1 comprising the additional steps, before distilling, of mixing the separated organic layer with an aqueous solution of sodium nitrite in sufficient proportion to provide a two-phase system while agitating and heating to a temperature at most equal to the boiling point of the alcohol and again separating the organic phase from the aqueous phase while maintaining the temperature at between 40° and the boiling point of the alcohol whereby the total metal salt content of said organic phase is less than 1% of which at least 80% is the sodium nitrite.

3. The process as set forth in claim 1 wherein said organic phase is separated from the aqueous phase by settling and decanting.

4. The process as set forth in claim 1 wherein said organic phase is separated from the aqueous phase by centrifuging.

References Cited

UNITED STATES PATENTS 2,455,659  12/1948  Duncan et al. _____ 252—33.4
2,497,152   2/1950  Cohen _____ 260—504

FOREIGN PATENTS 789,857  1/1958  Great Britain.

ALEX MAZEL, Primary Examiner
J. H. TURNIPSEED, Assistant Examiner

U.S. Cl. X.R.

203—39; 252—33, 33.4, 389; 260—401, 504, 505